US009614374B2

(12) United States Patent
Patel et al.

(10) Patent No.: US 9,614,374 B2
(45) Date of Patent: *Apr. 4, 2017

(54) METHOD FOR CONTROLLING ENERGY STORAGE SYSTEM

(71) Applicant: GENERAL ELECTRIC COMPANY, Schenectady, NY (US)

(72) Inventors: Pranav N. Patel, West Chester, OH (US); Shawn A McClintic, Fairview, PA (US)

(73) Assignee: General Electric Company, Schenectady, NY (US)

( * ) Notice: Subject to any disclaimer, the term of this patent is extended or adjusted under 35 U.S.C. 154(b) by 982 days.

This patent is subject to a terminal disclaimer.

(21) Appl. No.: 13/903,347

(22) Filed: May 28, 2013

(65) Prior Publication Data

US 2013/0249289 A1    Sep. 26, 2013

Related U.S. Application Data

(63) Continuation-in-part of application No. 12/644,430, filed on Dec. 22, 2009, now Pat. No. 8,471,406.

(Continued)

(51) Int. Cl.
*H02J 7/00* (2006.01)
*H02J 9/00* (2006.01)
*H02J 3/28* (2006.01)
*H02J 4/00* (2006.01)
*H02J 9/06* (2006.01)
*H02J 3/32* (2006.01)
*H02J 3/14* (2006.01)

(Continued)

(52) U.S. Cl.
CPC ...... *H02J 3/28* (2013.01); *H02J 3/14* (2013.01); *H02J 3/32* (2013.01); *H02J 4/00* (2013.01); *H02J 9/062* (2013.01); *H02J 3/30* (2013.01); *H02J 3/383* (2013.01); *H02J 3/387* (2013.01); *H02J 2003/146* (2013.01); *Y02B 10/72* (2013.01); *Y02B 70/3225* (2013.01); *Y02B 70/3291* (2013.01); *Y02B 90/14* (2013.01); *Y02E 10/563* (2013.01); *Y02E 10/566* (2013.01); *Y02E 70/30* (2013.01); *Y04S 20/222* (2013.01); *Y04S 20/224* (2013.01); *Y04S 20/248* (2013.01); *Y10T 307/367* (2015.04); *Y10T 307/625* (2015.04)

(58) Field of Classification Search
CPC ....... H02J 3/28; H02J 3/32; H02J 7/00; Y10T 307/625
USPC ......................... 307/43, 44, 64, 66
See application file for complete search history.

(56) References Cited

U.S. PATENT DOCUMENTS 8,471,406 B2 * 6/2013 Patel ..................... H02J 3/28
307/66
2007/0200433 A1 * 8/2007 Kelty ..................... G06Q 50/06
307/66

* cited by examiner

*Primary Examiner* — Carlos Amaya
(74) *Attorney, Agent, or Firm* — Dority & Manning, P.A.

(57) ABSTRACT

A system includes an energy storage system capable of receiving electrical energy from an energy source and can supply electrical energy to a first load during a first period and to the first load during a second period. The first load differs in usage rate from the first period relative to the second period. A system controller maintains the energy storage system such that the energy storage system maintains a first amount of stored electrical energy during a first mode, and a second amount of electrical energy during a second mode. The system controller maintains the energy storage system in the first mode during a first portion of the first period, and in the second mode during a second portion of the first period.

16 Claims, 4 Drawing Sheets

Related U.S. Application Data

(60) Provisional application No. 61/257,462, filed on Nov. 2, 2009.

(51) Int. Cl.
*H02J 3/30* (2006.01)
*H02J 3/38* (2006.01)

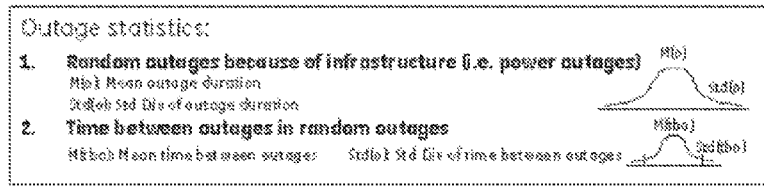
Fig. 3
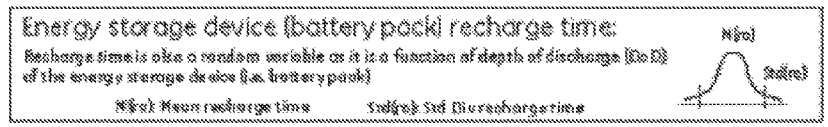
Fig. 4
| | DAY RATE | | | NIGHT RATE |
|---|---|---|---|---|
| | 7:00 AM | 11:00 AM | 5:00 PM | 9:00 PM |
| Monday | | | | |
| Tuesday | PEAK COST | MID COST | PEAK COST | |
| Wednesday | 12.0¢/kWh | 10.37¢/kWh | 12.0¢/kWh | LOW COST |
| Thursday | | | | 8.25¢/kWh |
| Friday | | | | |
| Saturday | | | | |
| Sunday | | | | |
| Compare | WINTER RATE STANDARD 9.945 CENTS PER KILO WATT HOUR | | | |
Fig. 5A

METHOD FOR CONTROLLING ENERGY STORAGE SYSTEM

CROSS REFERENCE TO RELATED APPLICATIONS

This application claims benefit and priority to and is a continuation-in-part patent application of pending U.S. patent application Ser. No. 12/644,430 filed on Dec. 22, 2009 which is a non-provisional application that claims benefit and priority to provisional patent application Ser. No. 61/257,462 filed on Nov. 2, 2009, the disclosures of which are incorporated herein by reference in their entirety.

BACKGROUND

Technical Field

Embodiments of the invention may relate to a system for the utilization of energy. Embodiments of the invention may relate to a method of using a system for the utilization of energy and for energy storage.

Discussion of Art

It may be desirable to have access and continuity of service for high quality electrical power. Sometimes, there may be an electrical power outage. These power outages may be due to performance of power grid systems or to natural or man-made causes. It may be desirable to eliminate or reduce the impact of breaks in the continuity of service felt by the end-user. Industrial electrical power backup power systems may provide continuity of service to an end-user during outages or breaks in the supply of electrical power from an electrical grid system.

Current back-up power infrastructures include an energy storage device (i.e., battery), generators, flywheels, and the like to provide immediate electrical power in case of an outage. Longer-term solutions may include fuel cells or other renewable sources like off-grid wind turbine and solar panels. In some cases, an energy storage device is used in combination another power generating sources, or the backup systems are phased in based on time-to-availability. That is, a fly-wheel might provide power instantly but for a short time while an internal combustion generator spins up to accept the electrical load. Thus, one factor of several that goes into selection of a back-up system includes the time-to-availability.

In certain applications and locations, there may be a regulatory mandate for minimum duration of back-up time. For example, there may be a minimum of 8-hour back-up power for telecommunication (telecom) equipment. This may be in response to emergencies or disasters, to allow for the coordination of an emergency response.

There may be a desire for back-up electrical power based on any of a number of other considerations, beyond regulatory compliance, that affects the type of back-up, the amount of back-up that can be provided by the system (in terms of total power, or length of time to deliver the power), the weight, the volume, the environmental resistance, the serviceability, the material selection, and a host of other features and functions. It may be desirable to have a system, or a device, assembly or apparatus that structurally and/or functionally differs from those that are currently available.

BRIEF DESCRIPTION

In one embodiment, a method for controlling an energy storage system includes determining a first minimum capacity for a first period based on a first consumption rate, and second minimum capacity for a second period based on a second consumption rate. These minimum capacities may be for an energy storage system and based at least in part on a fixed minimum power reserve time. The first and second minimum capacities differ based on their respective consumption rates relative to the fixed minimum power reserve time. An amount of stored electrical capacity may be obtained during the first period that is about equal to or greater than the second minimum capacity. Energy from the energy storage system may be paid out during a portion of the second period so that an amount of stored electrical capacity is sufficient to supply power to the load for the fixed minimum power reserve time.

In one embodiment, a method includes supplying electrical energy to a first load during a first portion of a single period. The first portion may be defined as one of a peak period or a non-peak period. Electrical energy may be supplied to a second load during a second portion of the single period. An energy storage system may be maintained at a plurality of minimum capacity levels. The minimum capacity levels include a first amount of stored electrical energy during a first mode, and a second amount of stored electrical energy during a second mode. The energy storage system may be maintained in the first mode during the first portion in which the first load is supplied with electrical energy by the energy storage system and in the second mode during the second portion. The first amount is sufficient to power a determined demand load and an additional capacity, and the second amount is sufficient to power the determined demand load.

In one embodiment, a system interacts with an energy source capable of providing electrical power for a supply period to a load, but the energy source does not provide power to the load during one or more non-supply periods, and the non-supply period is intermittent or unpredictable. The system includes a power backup unit coupleable to the load and able to provide electrical power to the load during the non-supply period. An energy storage system couples to the power backup unit and/or to the energy source. A controller can retain a dynamic determined power reserve level in the energy storage system based on one or more of a usage rate based on the load, a capacity of the energy storage system, a state of charge of the energy storage system, a hazard warning indicative of an outage, or a forecast outage. The controller can expend at least a portion of the determined power reserve level to i.) generate an economic advantage relative to consuming power from the power backup unit, or ii.) maintain a statistical uptime level greater than a determined threshold value. Also, the controller selectively charge the energy storage system from the power backup unit or from the energy source.

BRIEF DESCRIPTION OF THE DRAWINGS

FIG. 3 is a graphic depiction showing outage statistics.

FIG. 4 is a graphic depiction showing energy storage device recharge time.

FIGS. 5A and 5B are tables providing example electrical power costing data distributed over a day/week timeframe for summer and winter months, respectively.

FIG. 6 is a graphic depiction showing battery capacity utilization, using a telecommunication radio base station as an example.

DETAILED DESCRIPTION

Embodiments of the invention may relate to a system for the utilization of energy. Embodiments of the invention may relate to a method of using a system for the utilization of energy.

In one embodiment, a system and method is provided for improving utilization of an energy storage backup system to reduce operating cost while maintaining a determined service level during outages. Selection may include (1) appropriately planning a determined back-up capacity based on at least one adaptive statistical model, and (2) utilizing these assets for another usage. The model may be derived from such considerations as past outage duration lengths, time between outages, and potential power demands during outages. Potential power demands may consider such factors as time of the day, day of the week, time of the year. A suitable other usage may include energy arbitrage. Improved utilization of these assets may reduce operating cost by reducing energy cost of the system employing the energy storage backup system.

The energy storage back-up system may be useful for datacenter, healthcare center, or industrial manufacturer; a telecommunication base station, or even a residential consumer. The end use or supported site may affect such items as the size and capacity of the energy storage back-up system, and will influence such items as the minimum required back-up reserve amount, the duty cycle, regulatory requirements, desired uptime statistics, and the like.

Figure 1:
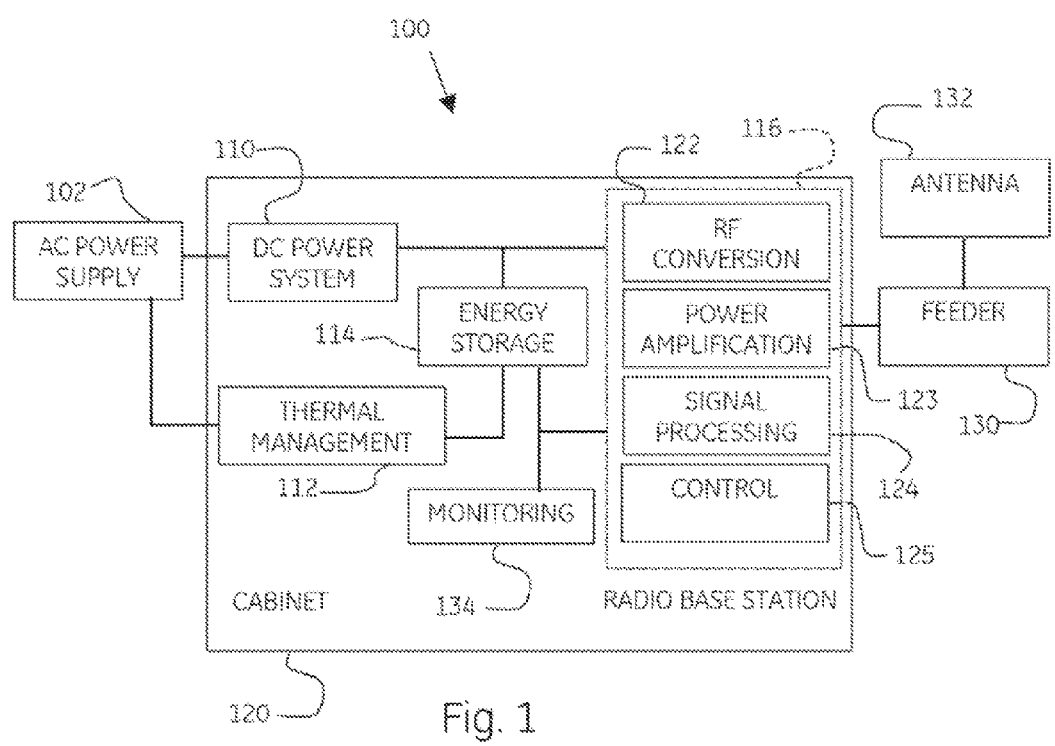
FIG. 1 is a schematic diagram showing an exemplary system that includes an embodiment of the invention.

With reference to FIG. 1, a back-up or energy storage system 100 is used for back-up power in addition to required functionality in terms of components and algorithms with the DC power system to integrate it in the system. The system electrically communicates with an AC utility grid 102. The system includes a DC power system 110, a thermal management system 112, an energy storage system 114 including an energy storage device, and a radio base station (RBS) 116, all of which is housed in a cabinet 120. The RBS includes a RF conversion module 122, a power amplification module 123, a signal processing module 124, and control module 125. The system communicates to a feeder 130, which in turn provides or feeds a signal out to an antenna 132. An optional monitoring system 134 communicates with various components and aspects of the overall system, and can remotely monitor, diagnosis, and implement corrective actions based on a determined set of parameters.

The back-up system includes processors, controls, and actuators sufficient to perform the methods as described herein. The system includes a system controller, not shown, that maintains the energy storage system such that a first amount of stored electrical energy is maintained in a first mode of operation. A second amount of electrical energy is maintained in a second mode of operation. The system controller maintains the energy storage system in the first mode during a first portion of the first period, and in the second mode during a second portion of the first period. The duration and time of the first and second modes of operation are defined in more detail hereinbelow, as well as factors, weightings, calculations, parameters and considerations used by the system to determine the duration and timing of the various operating modes.

The system controller can determine a duration of the second mode based on one or more of the usage rate, a capacity of the energy storage system, a hazard warning indicative of an outage or forecast outage, or energy source factors. The usage rate can be the peak usage rate, and further can be the maximum usage rate estimated for the first period. The usage rate can be measured, and thus a measured rate, or can be estimated for an estimated rate. As with most or all measured parameters, sensors and the like may be employed. A suitable estimated rate can be based on one or more of the time of day, day of week, season of year, presence of a holiday or an event, or environmental conditions. Similar to the usage rate, the capacity of the energy storage system can be measured or estimated. The estimated capacity can be based on age of the components, individually or on average, or history of usage. The hazard warning can indicate an incipient or current outage. That outage may be based on one or more of a weather related notice, or a sensor reading. Sensor readings may be for one or more of ambient temperature, humidity, barometric pressure, or seismic activity. Suitable energy source factors can include one or more of availability, cost, environmental effect, or component life cycle impact. In one embodiment, the availability factor includes solar availability or wind availability. In one embodiment, the environmental effect includes one or more of NOx, SOx, carbon emissions, noise, or ambient particulate matter. Outer environmental effects can include one or more ambient environmental factors such as an ozone measurement, humidity, salinity, wind speed, wind direction, or ultraviolet index.

Figure 2:
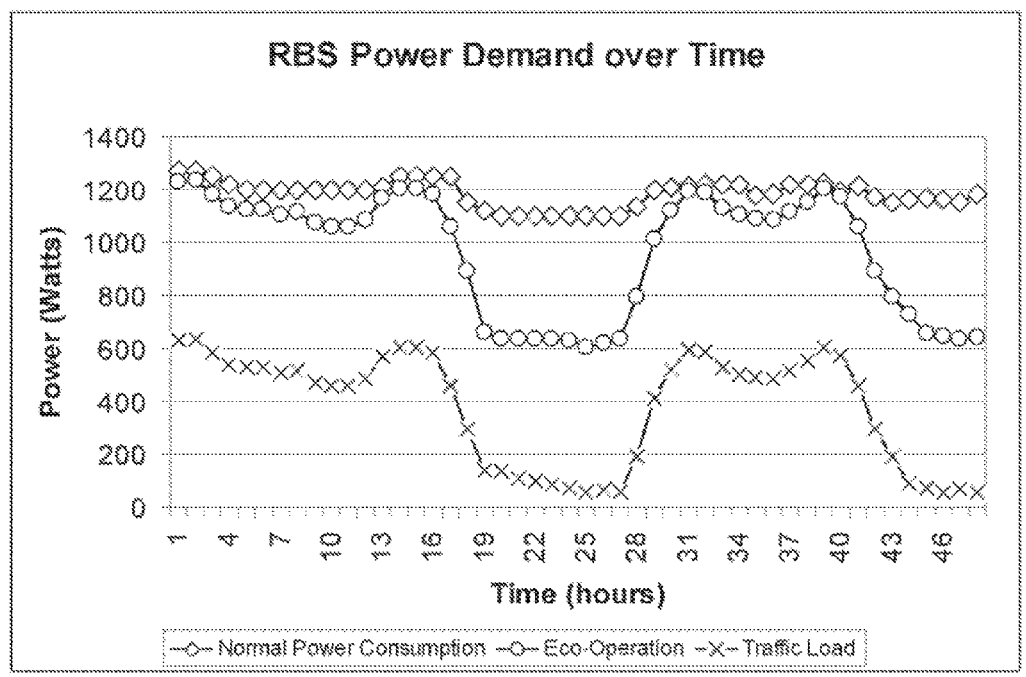
FIG. 2 is a graphic depiction showing power demand (Watts) over a 24-hour period for a Radio Base Station.

With reference to FIG. 2, a graphical illustration shows that over the course of a day, there are periods that have increased power consumption, and other periods that have relatively decreased power consumption (expressed in Watts). As indicated, the RBS has a traffic load variation that correspondingly changes over the course of the day. The MIS system has a plurality of operating modes, and in one of the operating modes the power supply is closely matched to the anticipated traffic load, and therefore reduces power consumption to more closely track actual need and usage.

Particularly, the call traffic may be high during the day, and may be low during the evening and nights. To improve the efficiency of telecom network, operators operate the base station in a power-saving mode, referred to as ECO mode. In the ECO mode, the operators turn off some of power amplifiers during the time when the traffic is lower. Turning off amplifiers reduces energy consumption, and can save on energy costs. However, power demand is a random variable. It is a function of number of calls during a period of time. The figure shows the power demand density during the peak hour and off-peak hour. It could be assumed that the data shows a normally distributed function.

The energy storage device has a capacity that is determined and sized based on several factors. One such calculation of battery capacity may be based on mandated minimum back-up time. The system users (e.g., telecom callers) desire service during a peak calling time. The battery capacity can be calculated in the system based on power during the peak time. The battery capacity can be calculated based on following equation:

$$\text{Battery Capacity}_R = T^* M_{(pp)} + Z_{factor} * \text{sqrt}(T^* \text{Std}_{(pp)}{}^2)$$

where T is the mandated backup time available in hours.

$Z_{factor}$ is service level factor. The service level factor can be calculated by Normal Inverse function. For example, to achieve 99.99% service level, the value of $Z_{factor}$ is 3.72; and to achieve 98% service level, the $Z_{factor}$ is 2.05.

Calculation of battery capacity based on historical outage statistics may be determined as follows, and with this information, an automated system according to one embodiment can forecast statistical system needs, and can calculate desired back-up power needed during the peak time and off-peak time outage durations. Desired Battery Capacity during Peak Time if Outage Occurs can be calculated as follows:

$$\text{Battery Capacity}_{(peak)} = M_{(o)} * M_{(pp)} + Z_{factor} * \sqrt{M_{(o)} * \text{Std}_{(pd)}^2 + M_{(pd)}^2 * \text{Std}_{(o)}^2}$$

Desired Battery Capacity during Off-peak Time if Outage Occurs:

$$\text{Battery Capacity}_{(Offpeak)} = M_{(o)} * M_{(pd)} + Z_{factor} * \sqrt{M_{(o)} * \text{Std}_{(pd)}^2 + M_{(pd)}^2 * \text{Std}_{(o)}^2}$$

Because Battery Capacity$_{(peak)}$>Battery Capacity$_{(off-peak)}$, the battery capacity planned can be calculated by:

$$\text{Battery Capacity}_s = \text{Battery Capacity}_{(peak)}$$

The system can calculate time between outages, which can be treated as a random variable.

$$\text{Time between Outages} = M_{(tbo)} + Z_{factor} * \text{Std}_{(tbo)}$$

The system can calculate recharge time based at least in part on the following information and equations. The recharge time can be a function of Depth of Discharge, which can be treated as a random variable. The required statistics on past outages can be extrapolated from empirical data, as illustrated in FIG. 3. Such information can be provided by a local power provider (either as a data push or pull) or from a data acquisition system built into the back-up power system. In one embodiment, a software program instructs a general or specific purpose computer using one or more processors. To make the system adaptive, the data acquisition system may update the statistics on rolling basis.

A particular battery capacity base may be appropriately sized based at least on location specific infrastructure information. There are at least two considerations to determine an appropriate capacity and capability of the battery system: (1) Regulatory mandate for minimum back-up time (2) past outage statistics to calculate the battery capacity. If the battery capacity size, measured in kWh, calculated based on demand of power and minimum back-up time per regulatory mandate is higher than statistically calculated battery size, the higher capacity can be used to size the battery.

$$\text{Recharge Time} = M_{(rc)} + Z_{factor} * \text{Std}_{(rc)}$$

In some instances the infrastructure is sufficient for the Time between Outages to be much greater than the Recharge Time. However, if the Time between Outages is less than Recharge Time, another back-up generating source may be employed. Suitable additional back-up generating sources may include fuel converters, such as digital generator, fuel cell, and renewable sources. Renewables can include a wind turbine or solar panel, and the like. A Time between Outages that is less than the Recharge Time may be more probable in geographic regions where power infrastructure is relatively poor.

The Battery capacity determination may include selecting the capacity needed based on regulatory mandate (Battery Capacity$_R$) and statistical determined needs (Battery Capacity$_s$).

$$\text{Battery Capacity} = \text{Larger of}(\text{Battery Capacity}_R, \text{Battery Capacity}_s)$$

With a determined Battery Capacity, the system can execute utilization of back-up power storage for other usage in accordance with an aspect of the invention. At least two exemplary scenarios and methods are provided to illustrate.

In a first scenario, a radio base station system has communication linkages with other natural disaster oriented or hazard warning systems such as weather channel. The system can predict or determine that there is a relatively increased risk of an outage based on the hazard warning. In case of such a warning of potential outage due to a natural disaster (hurricane, tornado, and the like), the system can avoid using the excess capacity or active reserve for arbitrage. Rather, the system may add to the power reserve store. In one embodiment, receipt of a hazard warning by the controller may cause the controller to keep the battery (or storage system) fully charged (at 100% state of charge) waiting for potential outage.

In another scenario, one without a hazard warning being issued, the system can use the energy storage asset for duties additional to power back-up in case of an outage. Because the required reserve back-up capacity during off-peak hours is less than the Battery Capacity, there is excess capacity during the off-peak hours that is available for arbitrage. In one embodiment, the system dynamically adjusts the reserve back-up capacity based on peak versus off-peak scheduling.

The excess battery capacity available for arbitrage can be calculated as follows:

$$\text{Capacity for Other Usage} = \text{Battery Capacity} - \text{Battery Capacity}_{(off-peak)}$$

Figures 5B, 6:
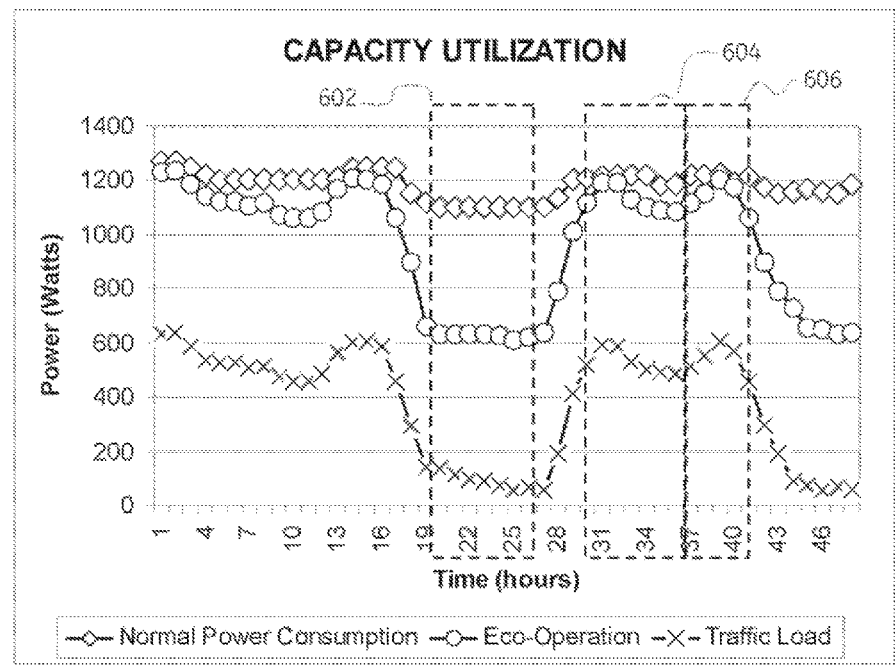

The demand for electricity can be relatively higher during the day compared to night. It may be the case that supply and demand principles allow for a pricing differential such that daytime rates are relatively higher than nighttime rates. That is, the electrical utility may offer different time-of-use rates such that the rate for electricity is higher during the day and lower in the off-peak hours. The day-night price differences differ from one location to another. The tables that are shown in FIGS. 5A and 5B each are an example of rate charts from a utility in the Northeastern region of the United States. FIG. 5A is representative of the winter months of October through May, while FIG. 5B is representative of the summer months of June through September. During the winter months the peak usage is in the morning and early evening with the mid-day being mid cost. During the summer months the peak cost is during mid-day, with the mid-cost periods being in the morning and evening. For both yearly periods, low cost is during the night hours. As smart metering, or smart grid, technologies become more predominant better tailoring of power generation to power consumption will be possible. And, 'smart' power management may allow for fewer outages, outages of decreased duration, and more predictability of outages. Better outage data sets may allow for more precise calculations to draw more tight tolerances for energy arbitrage, while maintaining a determined statistical uptime level.

Using basic energy arbitrage principles, because the rates are lower during the off-peak hours, the battery storage can be charged during that time. But, building on the basic energy arbitrage technique, it may not always be necessary to maintain a static amount of energy reserve or back-up power throughout the 24-hour day. The system may be implemented such that during the off-peak hours, the required energy reserve amount is relatively less than at other times. The reserve capacity differential when moving from a first period with a higher reserve need to a second period with a lower reserve need, may allow for the reserve capacity differential amount to be used at the transition point from the first to the second period. This process is pictorially demonstrated in FIG. 6.

The energy storage system is charged from the power generation source during the lower cost, off-peak usage period 602. The load is supplied from the grid during the first portion of the peak usage period 604. The load is supplied from the energy storage system during the second portion of the peak usage period 606. This allows for the needed reserve to be maintained at all times, at the level needed for that period. The duration of the second portion can be determined with reference to, for example, the overall system capacity, the differential amount of back-up needed as between the first and second peak usage periods, spin-up time, and the rate at which the system capacity would be consumed if an outage were to occur during the draw down second portion. Additional considerations may be included, as noted elsewhere herein, and more than two operating modes may be utilized to account for additional scenarios and parameters.

In one example, where there is a stipulation of a 8-hour back-up power supply, and that back-up period is static and unchanging, 8 hours of peak usage may equate to X1 amount of energy in Watts, but 8 hours of off-peak usage may equate to X2 amount of energy in Watts. According to one embodiment, it would not be necessary to keep X1 amount of energy on call for use during an outage during the off-peak time. According to another embodiment, neither would it be necessary to keep X1 amount of energy stored until the start of the off-peak period starts because the difference of X1–X2 could not be consumed instantly during the transition from peak to off-peak time. That difference of X1–X2 in energy can be integrated with reference to the usage rate during peak usage times, and once determined, can be played out during the peak time, and at the peak prices. The process can be reversed at the tail end of the off-peak period so that the energy storage backup system enters the peak period with a full 8-hour reserve (at the peak usage rate) per the requirement of this example.

According to at least one embodiment, portions of the back-up reserve amount can be used or discharged during the peak hours when the cost is high, thereby displacing energy that is otherwise purchased off the grid at the higher cost. The cost of energy can be reduced to the off-peak rate for some duration as the power from the back-up storage is used during the peak hours. An daily energy cost saving when rate difference is available:

Daily Cost Saving with Differential Rate=(Capacity available for arbitrage)*(Peak Cost−Lower Cost)

In one embodiment, the system includes two or more power generating sources each having a different cost. The system can calculate or determine the cost of energy from each source, and can charge the back-up storage from the least costly source. This can account for the cost of energy from some sources being less than the cost of electricity from the grid.

The system can be supplied with cost information for each of a plurality of energy generating or supply systems. For example, the system may be provided with fuel oil costs, natural gas costs, and grid electricity costs. This information can be paired with other information, such as fuel consumption rate, fuel storage levels, fuel delivery schedules, tax incentives/penalties, weather forecasts, commodity indices and projections, emissions rates, and environmental factors. The environmental factors can include particulate amounts, UV index, ground ozone levels, SOx and NOx levels, and the like. The system can select to pass through, or store energy from, any one of these sources based on the total energy costs, the emissions profile, and economic considerations.

In a scenario where the energy storage system electrically communicates with a power grid, a solar power generation device, a wind power generation device, a tidal power generation device, a diesel generator, and a bio-mass methane powered fuel cell, the follow scenarios may play out. Of note is that it may be unlikely that one energy storage device would communicate with so many types of power-generating equipment, the diversity serves to help illustrate the point. During a week day, with no wind and no clouds, a ground level ozone warning, in the late summer, with low diesel costs but a low diesel reserve and a re-fuel not scheduled for more than a week, the energy storage system may elect to draw power from, or alternative actively signal to the power generating device in a pull rather than push mode, the solar device to its full capacity, then from the tidal device to its full capacity, and then from the bio-mass fuel cell due to the abundance of bio-mass at this time of year. This might also result in an environmental benefit if account is made for pollutant levels. In another scenario, during a cold, overcast, blustery late winter night with a full diesel reserve, the energy storage system may elect to pull power from wind generator to its full capacity, and then from the diesel generator after checking the energy cost vs. grid power price. A myriad other combinations are available that can be addressed by weighing each of the above factors.

While weighing factors and inputs, weighting might be used to achieve determined outcomes. Such weighting factors can include the use capacity of the grid (and how close the grid is to its total capacity, and its optimal power generation level), the emissions that are a result of most power generation relative to environmental conditions (e.g., choosing to not run diesel generators during an ozone alert even if there is a cost advantage to doing so), and the life cycle costs or wear and tear on the equipment. Life cycle costs can include the generating equipment, but can also include the life of the energy storage devices in the back-up system. A bank of lead acid batteries, for example, may deteriorate due to heavy cycling, hastening the need for replacement, and increasing the life cycle cost of the system.

Advanced energy storage systems may have relatively longer cycle life that is available at a greater depth of discharge (DoD) than traditional batteries, such as lead acid batteries. The system may factor in the cycle life and DoD of the energy storage system prior to using arbitrage. Or, rather, the system may account for the energy storage system costs as a fraction of the life used multiplied by the replacement costs of the battery components. For example, an arbitrage system may have about 1 cycle per day, or about 365 charge-discharge cycles per year at different depth of discharges (or some other cycle number that accounts for weekends, holidays, and other usage affecting factors). A lead acid battery may have a cycle life of around 500 cycles, such that the lead acid battery would need replacing before the second year of service. With sufficiently high energy differential pricing, and sufficiently low replacement costs, this approach may be practical and economical. An advanced battery technology, such as a sodium metal halide system, may have a cycle life of 5,000 to 6,000 cycles. Under the same circumstances, there would be over 13 years life, and the ability to account for the system component replacement cost may be relatively more economical. A similar calculation can be made using DoD, or energy capacity.

As used herein, "arbitrage", or sometimes "energy arbitrage", means a method of storing energy when electricity is being produced beyond current demand (and/or prices are relative low), and distributing energy when demand for electricity is high (and/or prices are relatively high). Peak means the usage is at a relative high point over a determined period. As used herein, the period associated with the Peak is a day unless context or language indicates otherwise. Similarly, the term Off-Peak refers to the relative low point over the determined period. Energy storage systems include batteries, flow cells, fuel cells, capacitors, fly wheels, and the like. Batteries, unless specified otherwise, include sodium metal halide, sodium sulfur, nickel metal hydride, nickel cadmium, lithium, zinc, and lead acid batteries, and the like. Energy converters include one or more of solar-based energy generation system; a wind-based energy generation system; a hydro-electric, piezoelectric, or thermo-electric generation system; or a combustion engine.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial amount or immaterial structure, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

The embodiments described herein are examples of articles, compositions, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, compositions and methods that do not differ from the literal language of the claims, and further includes other articles, compositions' and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A method for controlling an energy storage system, comprising:
   determining a first minimum capacity for a first period based on a first consumption rate, and second minimum capacity for a second period based on a second consumption rate, for an energy storage system based at least in part on a fixed minimum power reserve time, wherein the first and second minimum capacities differ based on their respective consumption rates relative to the fixed minimum power reserve time;
   obtaining an amount of stored electrical capacity during the first period that is about equal to or greater than the second minimum capacity; and
   paying out energy from the energy storage system during a portion of the second period so that an amount of stored electrical capacity is sufficient to supply power to a load for the fixed minimum power reserve time.

2. The method of claim 1, further comprising:
   determining the second consumption rate; and
   determining a length of the portion of the second period to supply power to the load to maintain the amount of stored electrical capacity for the fixed minimum power reserve time.

3. The method of claim 1, further comprising:
   determining the second consumption rate; and
   determining a rate of pay out to supply power to the load to maintain the amount of stored electrical capacity for the fixed minimum power reserve time.

4. The method of claim 1, wherein the first period and the second period are a single 24 hour period, and further comprising adjusting the second minimum capacity as a function of time over the second period.

5. The method of claim 1, further comprising:
   retaining a dynamic determined power reserve level in the energy storage system based on one or more of a usage rate based on the load, a capacity of the energy storage system, a state of charge of the energy storage system, a hazard warning indicative of an outage, or an outage forecast; and
   expending at least a portion of the determined power reserve level to generate an economic advantage relative to consuming power from a power backup unit.

6. The method of claim 5, further comprising charging selectively the energy storage system from the power backup unit or from an energy source.

7. The method of claim 6, further comprising determining a fuel cost for operating the power backup unit.

8. The method of claim 7, further comprising comparing the fuel cost to an energy cost of electricity supplied from the energy source.

9. The method of claim 5, wherein expending at least a portion of the determined power reserve level to generate comprises maintaining a statistical uptime level greater than a determined threshold value.

10. The method of claim 1, further comprising determining a duration of the second period based on one or more of a usage rate, a capacity of the energy storage system, or a hazard warning indicative of an outage.

11. The method of claim 10, further comprising estimating the usage rate based on one or more of time of day, day of week, season of year, presence of a holiday or an event, or environmental conditions.

12. The method of claim 10, further comprising measuring the usage rate.

13. A method, comprising:
   supplying electrical energy to a first load during a first portion of a single period that is defined as one of a peak period or a non-peak period, and to a second load during a second portion of the single period;

maintaining an energy storage system at a plurality of minimum capacity levels, wherein the minimum capacity levels include a first amount of stored electrical energy during a first mode, and a second amount of stored electrical energy during a second mode; and maintaining the energy storage system in the first mode during the first portion in which the first load is supplied with electrical energy by the energy storage system, and in the second mode during the second portion, wherein the first amount is sufficient to power a determined demand load and an additional capacity, and the second amount is sufficient to power the determined demand load.

14. The method as defined in claim 13, further comprising supplying energy to the energy storage system from an electrical utility grid.

15. The method as defined in claim 13, further comprising supplying energy to the energy storage system from a combustion engine driven generator.

16. The method as defined in claim 13, further comprising adjusting the additional capacity based on age of the components of the energy storage system, individually or on average, or history of usage of the energy storage system.

* * * * *